United States Patent
Rüoff-Schäfer

Patent Number: 4,642,253
Date of Patent: Feb. 10, 1987

[54] INSULATING MATERIAL FOR PIPES

[75] Inventor: Rüdolf Rüoff-Schäfer, Stuttgart, Fed. Rep. of Germany

[73] Assignee: Missel GmbH & Co., Stuttgart, Fed. Rep. of Germany

[21] Appl. No.: 714,989

[22] Filed: Mar. 22, 1985

[30] Foreign Application Priority Data

Mar. 23, 1984 [DE] Fed. Rep. of Germany ....... 3410838

[51] Int. Cl.⁴ .................. F16L 59/14; F16L 59/02
[52] U.S. Cl. .................................... 428/36; 138/105; 138/149; 52/220
[58] Field of Search ............... 138/105, 147, 149, 161; 52/220, 404; 428/36

[56] References Cited

U.S. PATENT DOCUMENTS

| | | | |
|---|---|---|---|
| 2,997,071 | 8/1961 | May | 138/105 |
| 3,563,825 | 2/1971 | Segura et al. | 138/105 |
| 3,941,159 | 3/1976 | Toll | 138/149 |
| 4,119,751 | 10/1978 | Nilsson et al. | 138/105 |
| 4,148,341 | 4/1979 | Lundbohm | 138/105 |

FOREIGN PATENT DOCUMENTS 2604363 10/1977 Fed. Rep. of Germany.
2216513  2/1974 France.

Primary Examiner—John E. Kittle
Assistant Examiner—James J. Seidleck
Attorney, Agent, or Firm—Lalos, Keegan & Kaye

[57] ABSTRACT

An insulating material for pipes which consists of a layer of insulation and a sleeve that surrounds the pipe with the insulating layer being asymmetrically arranged relative to the pipe which is to be insulated.

19 Claims, 3 Drawing Figures

INSULATING MATERIAL FOR PIPES

BACKGROUND OF THE INVENTION

The invention relates to insulating material for pipes which are to be layed on the surfaces of floors, in particular on crude or rough-cast concrete floors.

As a result of existing regulations pipes of heating installations which carry warm water must be protected against heat loss and thus insulated. For this purpose it is known and customary to sleeve the pipes with a hose of foam material of ring-like cross-section. Such sleeved pipes then have a relatively large outer diameter as a result of the required thickness of insulation. For pipes with an outer diameter of ca. 22 mm the outer diameter of the thermally insulated pipe amounts to approximately 48 mm with an insulation thickness of for example 13 mm.

When layer pipes insulated in this manner on rough-cast concrete surfaces or floors the large outside diameter of the sleeved pipe causes problems, because the thermal and footstep noise insulation for the estrich (flooring plaster) must be applied above the pipe, and this results in an undesirably high construction.

OBJECTS OF THE INVENTION

The principal object underlying the invention is thus to provide an insulating material for pipes which are to be layed on rough-cast concrete surfaces, in particular on rough-cast concrete floors, which on the one hand provides the required insulation against heat losses but which on the other hand ensures a reduction of the outer diameter and which is finally of economical construction and simple to handle.

This object is satisfied, in accordance with the invention, by a layer of at least one ply of an insulating material which is layed on the concrete and forms a support for the pipe which is layed thereon, and by at least one sleeve which is either integrally formed with said layer or at least regionally connected thereto, wherein the sleeve at least substantially surrounds the pipe and has a thickness which merely amounts to a fraction of the thickness of said insulating layer.

The important concept underlying the invention is to take account of the requirements for insulation against heat losses by means of insulation which is strategically positioned from the point of view of its direction, and to exploit insulation already present in the construction of the building for a double purpose. Thus, when insulating pipes, heat losses in the direction towards the rough-cast concrete floor are prevented by a layer of insulation and the subsequent thermal and footstep insulation for the estrich (flooring plaster) is exploited at the sides and at the top. This results in a substantially lower constructional height, which makes it possible to accommodate the pipe which is insulated in problem-free manner in the footstep insulation below the estrich, and to provide the sleeving for the pipe in the lateral regions and in the upper region in advantageous manner with a strength such that the danger of damage is extensively precluded. It is also of advantage that expensive insulating material can be saved as a result of the invention because high grade thermal insulation is only used in locations where high grade insulation is also important.

The enclosing of the layer of insulating material by means of a sleeve having a thickness which only amounts to a fraction of the thickness of insulating material leads to a structure for the insulating material which means that it can be handled in the customary and accordingly simple manner. In the same way as with customary insulating sheaths or hoses the material of the invention can namely be drawn in the manner of a hose onto the particular pipe and it is then only necessary to pay attention to the correct positioning of the insulation. Specially shaped parts of the same or similar construction are preferably used in the vicinity of pipe bends or branches and then adjoin the hose-like insulating material without gaps.

The sleeve preferably consists of a water-impermeable foil material which ensures protection against moisture and aggressive building chemicals. In accordance with a preferred embodiment the sleeve is provided at the inside with at least one further reinforcement and-/or low friction (sliding) layer, which is thin in comparison to the layer of insulating material, and which can consist of fiber material or foam material, or of a double layer of fiber material and foam material, with a further foil being expediently provided for the innermost layer in order to minimise the sliding friction between the insulating material and the pipe during assembly.

In accordance with an alternative embodiment the insulating material of the invention is manufactured by the extrusion process with the outer layer of the extrusion body taking on the function of the sleeve, being made mechanically more rigid than the inwardly disposed layer of insulating material, and having a closed surface. The extrusion body can be made in one piece or in two pieces with a strip-like cover element being provided in the case of a two-part construction.

Further advantageous developments of the invention are set forth in the patent claims.

BRIEF DESCRIPTION OF THE PREFERRED EMBODIMENTS

Embodiments of the invention will now be explained in more detail by way of example only and with reference to the drawings in which are shown:

FIG. 1 a schematic cross-section of a first embodiment of an insulating material built up of individual components, FIG. 2 a schematic sectional view of an insulating material manufactured by extrusion, and FIG. 3 a partial side view of an insulating material with an integrated wall reinforcement.

DETAILED DESCRIPTION OF THE PREFERRED EMBODIMENT

Figure 1:
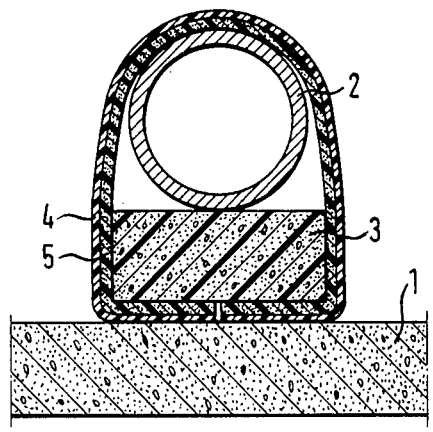

As seen in FIG. 1 a pipe 2 which conveys hot water is arranged on a rough-cast concrete surface, in particular on a concrete floor 1. This pipe 2 is surrounded by a hose-like insulating material which consists of a strip-like layer of insulation 3, a sleeve 4 and also a thin foam layer 5 connected to the inner side of this sleeve 4.

The layer of insulation 3 preferably consists of a single ply or multiple ply layer of foam material for which high grade thermal insulation can be used.

This layer 3 of insulating material lies between the pipe 2 and the rough-cast concrete floor 1 and thus fulfils the function of preventing heat losses relative to the rough-cast concrete floor.

The sleeve 4 which in particular consists of a reinforced plastic (synthetic) foil surrounds the pipe 2 and the insulating layer 3 so that both the pipe 2 and also the layer of insulation 3 are protected against aggressive building chemicals and also against moisture.

The thin foam layer 5 which is provided at the inner side of the foil sleeve 4 facilitates the handling of the insulating material because it brings a certain fundamental stability which facilitates the introduction of the respective pipe into this specially constructed insulating hose and also the sliding of the pipe in the hose.

The sleeve 4 is preferably fixedly connected with the underside of the insulating strip or layer 3, and is in particular adhered thereto. An adhesive bond with the side surfaces can however also be provided.

Furthermore, a sliding, clamped or other closure can be provided between the sleeve 4 and the strip 3 of foam material or between two regions of the sleeve 4.

By way of example the insulating material of the invention makes it possible, for pipe diameters of approximately 22 mm and a thickness of insulation of 13 mm, to reduce the outer diameter of the insulated pipe to approximately 37 mm which is of substantial advantage for the integration of the pipe in the footstep insulation beneath the estrich (flooring plaster).

Figure 2:
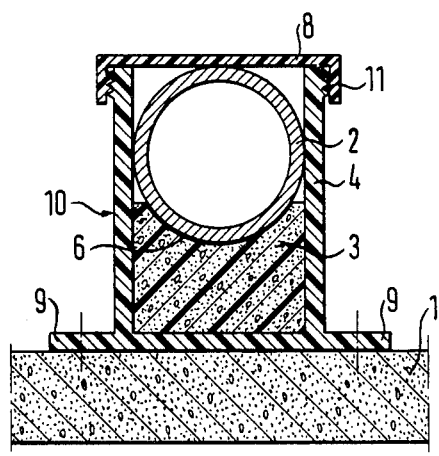

The embodiment of FIG. 2 shows an insulating material which is preferably formed by extrusion and which has an insulating layer 3 with a slight depression 6, with the insulating layer 3 being again provided at the base side of the insulator and being arranged in a sleeve 4. This sleeve 4 is simultaneously extruded with the layer of insulating material, has a substantially greater strength than the layer of insulating material, and is water- and vapor-tight. Flanges 9 are provided at the lower side by means of which the insulation can be secured to the rough cast concrete floor. This manner of attachment avoids the pressing together of the insulating layer 3 which frequently occurs when using clamping hoops and which leads to a change of the insulating characteristics.

The insulating material of FIG. 2 is constructed in the manner of a cable channel or run and can be closed at the top or, as shown in FIG. 2, provided with a lid 8 which can be snapped onto the sidewalls and which can be latched via latch elements 11.

Figure 3:
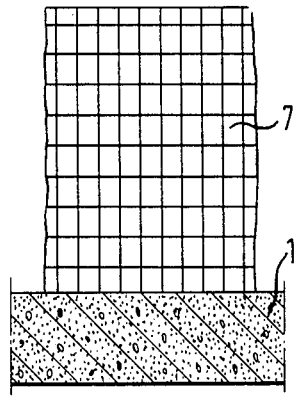

When the insulating material of FIG. 2 is not extruded a multi-part construction can also be provided for which purpose one requires a housing 10 which is approximately U-shaped in cross-section and which has a base side flange 9, a strip 3 of insulating material which is arranged in the housing and a cover element 8. The side view of FIG. 3 shows the integration of a reinforcement net 7 in the outer sleeve of the insulation material, whereby damage on the building site after assembly has been completed can be practically precluded.

I claim:

1. An insulation arrangement for a pipe which in operation carries a heated liquid, is laid on a rough cast concrete floor, and is subsequently buried beneath a layer of flooring plaster, comprising a pipe having a diameter, a floor side adjacent said floor, first and second side surfaces and a top side; insulation including an elongate layer of insulating material which is disposed beneath said floor side of said pipe and has a thickness at said bottom side, said layer forming a support for said pipe, and a sleeve of insulating material extending from said layer of insulating material substantially around said side surfaces of said pipe and over said top side, said sleeve having a thickness at said top side; and wherein said thickness of said sleeve at said top side is substantially less than said thickness of said layer of insulating material at said bottom side.

2. Insulating material in accordance with claim 1, wherein said layer of insulating material has the shape of a strip with a width approximately equal to said diameter of the pipe which is to be supported; and wherein the sleeve is of substantially hose-like construction.

3. Insulating material in accordance with claim 1, wherein the layer of insulating material has a recess for accommodating the pipe, said recess having a depth smaller than the diameter of the pipe.

4. Insulating material in accordance with claim 1, wherein said layer has a lower side and side surfaces; and wherein said sleeve consists of a water-impermeable foil which covers the lower side of said insulating layer and is secured to at least one of the lower side and to the side surfaces of the insulating layer.

5. Insulating material in accordance with claim 1, wherein said sleeve is connected with said layer via a releasable connection.

6. Insulating material in accordance with claim 1, wherein said sleeve is provided at the inside with a reinforcement layer which is thin in comparison to said layer of insulating material and which has the form of one of a fiber layer and a double layer of fiber material and foam material.

7. Insulating material in accordance with claim 1, wherein said sleeve consists of a foil material having an integrated reinforcement with a net structure at the outside.

8. Insulating material in accordance with claim 1, wherein said layer of insulating material and said sleeve consist of extruded material; and said material forming the sleeve has a higher strength and density than said layer of insulating material.

9. An insulation for a pipe in accordance with claim 1, wherein the thickness of said sleeve at said top side is substantially equal to two thirteenths of the thickness of said layer of insulating material at said bottom side.

10. An insulation for a pipe in accordance with claim 1, wherein said sleeve is integrally formed with said layer.

11. An insulation for a pipe in accordance with claim 1 wherein said sleeve is regionally connected to said layer.

12. Insulating arrangement for pipes, in particular for pipes which are to be laid on rough-cast concrete, comprising a layer of at least one ply of an insulating material at the bottom which forms a support for a pipe which is to be placed thereon, a pipe on said layer, and at least one sleeve of insulating material connected to the layer of insulating material, said sleeve at least substantially surrounding the pipe and having a thickness opposite its bottom which is substantially less than the thickness of the insulating layer so that there is substantially more insulating material below the pipe than above the pipe.

13. Insulating material as defined in claim 12, wherein the sleeve is integrally formed with said layer.

14. Insulating material as defined in claim 12, wherein the sleeve is regionally connected with said layer.

15. The combination of a heated liquid pipe surrounded by an insulating material as defined in claim 12.

16. An insulation for pipes intended to carry heated liquids, comprising:
 a layer of at least one ply of an insulating material having a base side forming a support for a pipe which is to be placed thereon;

at least one sleeve at least partially connected to said layer, with the sleeve being formed to at least substantially surround a pipe, and having a thickness which is a fraction of the thickness of the insulating layer;

said layer of insulating material being arranged in a synthetic housing which forms the sleeve, said housing being substantially U-shaped in cross section, and having a cover portion for closing the housing, said housing having laterally projecting securing flanges at the base side.

17. An insulation as defined in claim 16 wherein the housing material is relatively stiff, and the insulating layer of foam material consist of an integral extrusion body.

18. An insulation for a pipe which in operation carries a heated liquid, is laid on a rough cast concrete floor, and is subsequently buried beneath a layer of flooring plaster, wherein said pipe has a diameter, a floor side adjacent said floor, first and second side surfaces and a top side; wherein said insulation comprises an elongate layer of insulating material which is disposed beneath said floor side of said pipe and has a thickness at said bottom side, said layer forming a support for said pipe, and a sleeve of material extending from said layer of insulating material substantially around said side surfaces of said pipe and over said top side, said sleeve having a thickness at said top side; and wherein said thickness of said sleeve at said top side is merely a fraction of said thickness of said layer of insulating material at said bottom side, said layer of insulating material is arranged in a synthetic housing forming said sleeve, said housing being substantially U-shaped in cross-section and being closable by means of a cover part; and wherein said synthetic housing as laterally projecting securing flanges at the base side.

19. Insulating material in accordance with claim 18, wherein said relatively stiff synthetic housing and the insulating layer consisting of foam material consists of an integral extrusion body.

* * * * *